United States Patent
Matsunaga et al.

(10) Patent No.: US 7,537,716 B2
(45) Date of Patent: May 26, 2009

(54) METHOD FOR PRODUCING POROUS CERAMIC

(75) Inventors: Morikatsu Matsunaga, Nagoya (JP); Koushi Yamamoto, Nagoya (JP); Akira Kuriyama, Nagoya (JP)

(73) Assignees: Toagosei Co., Ltd., Tokyo (JP); NGK Insulators, Ltd., Nagoya-Shi (JP)

( * ) Notice: Subject to any disclaimer, the term of this patent is extended or adjusted under 35 U.S.C. 154(b) by 239 days.

(21) Appl. No.: 10/545,153

(22) PCT Filed: Feb. 5, 2004

(86) PCT No.: PCT/JP2004/001189

§ 371 (c)(1), (2), (4) Date: Aug. 8, 2005

(87) PCT Pub. No.: WO2004/071995

PCT Pub. Date: Aug. 26, 2004

(65) Prior Publication Data

US 2006/0192326 A1    Aug. 31, 2006

(30) Foreign Application Priority Data

Feb. 12, 2003    (JP) .............................. 2003-033704

(51) Int. Cl.
   *B29C 65/00*    (2006.01)
(52) U.S. Cl. ......................................... 264/44; 264/43
(58) Field of Classification Search ................... 264/43, 264/44
See application file for complete search history.

(56) References Cited

U.S. PATENT DOCUMENTS

| | | | | |
|---|---|---|---|---|
| 3,651,035 A | * | 3/1972 | Atkins | 526/264 |
| 5,312,868 A | * | 5/1994 | Abe et al. | 525/124 |
| 5,373,054 A | * | 12/1994 | Sanuki et al. | 525/57 |
| 6,174,978 B1 | * | 1/2001 | Hatsuda et al. | 526/240 |

FOREIGN PATENT DOCUMENTS

| | | |
|---|---|---|
| JP | 62/212274 | 9/1987 |
| JP | 08/073282 | 3/1996 |
| JP | 08/073283 | 3/1996 |
| JP | 0796831 | 3/1996 |
| JP | 10/167856 | 6/1998 |
| JP | 10/245278 | 9/1998 |
| JP | 11/049583 | 2/1999 |

* cited by examiner

*Primary Examiner*—Steven P Griffin
*Assistant Examiner*—Russell J Kemmerle, III
(74) *Attorney, Agent, or Firm*—Workman Nydegger

(57) ABSTRACT

The present invention relates to a method for producing porous ceramic, the method including molding a mixture containing a water absorbent polymer particle, a ceramic raw material, and water, the water absorbent polymer particle having a water absorption amount in a range of 5 to 30 ml/g at a pressure of 980 Pa, and heating and baking the resulting molded product. The water absorbent polymer particle is preferably composed of a polymer having a 2-acrylamide-2-methylpropanesulfonic acid unit or an acrylamide unit as a constituting monomer unit.

15 Claims, 1 Drawing Sheet

US 7,537,716 B2

METHOD FOR PRODUCING POROUS CERAMIC

TECHNICAL FIELD

The present invention relates to a method for producing a porous ceramic (i.e., ceramic having many fine pores), and particularly relates to a method for producing a porous ceramic with high porosity and high strength. Intended uses of the porous ceramic include filtration materials such as a ceramic filter for cleaning auto exhaust gas, a ceramic filter for cleaning exhaust gas exhausted from a thermal engine and a combustion equipment and a ceramic filter for filtering a liquid, such as water, catalytic carriers, such as catalysts for cleaning exhaust gas, heat exchange materials for cleaning automotive exhaust gas, thermal storage media, sintered substrates for batteries, heat insulating materials, and microbial carriers used for waste water disposal.

BACKGROUND ART

As a method for producing a porous ceramic, a method for utilizing a raw material where a ceramic aggregate itself is porous, and a method for mixing a foaming agent with a ceramic raw material have been known. There are problems in that in the former method, flexibility of design is less due to restriction of the raw materials whereas in the latter method, it is difficult to control properties of a pore amount and a pore size with good reproducibility. To solve those problems, a method have been known in which a water absorbent polymer which previously has absorbed water and has been swollen is used as a pore-forming agent and is added to a ceramic raw material and is kneaded, then the resulting mixture is molded into a certain shape, and subsequently dried or baked (see Japanese Laid-Open Patent Publication Nos. 62-212274, 8-73282, 10-167856 and 10-245278).

DISCLOSURE OF THE INVENTION

In the method of mixing the water absorbent polymer which previously has absorbed water and been swollen as a pore-forming agent with the ceramic raw material, molding and baking, not only the volume of the polymer itself which has absorbed water and been swollen but also the pore making action by producing voids between aggregate of the ceramic raw material by the water volume absorbed and retained inside are utilized.

However, in the prior art disclosed in the above-described Patent Documents, it is difficult to control a pore size distribution of a baked ceramic body and hardness of a kneaded product in steps due to a reason that the water absorbent polymer reverses the water before baking. It is an object of the present invention to provide a method for producing a porous ceramic, in which it is easy to control a pore size distribution of a baked ceramic body and a hardness of a kneaded product in steps, thereby obtaining a baked ceramic body with high porosity.

In order to solve the above problems, the method for producing the porous ceramic of the invention is characterized by including a step of molding a mixture containing water absorbent polymer particles where a water absorption amount is 5 to 30 ml/g at a pressure of 980 Pa, a ceramic raw material and water and a step of heating/baking a resulting molded product.

BEST MODE FOR CARRYING OUT THE INVENTION

Figure 1:
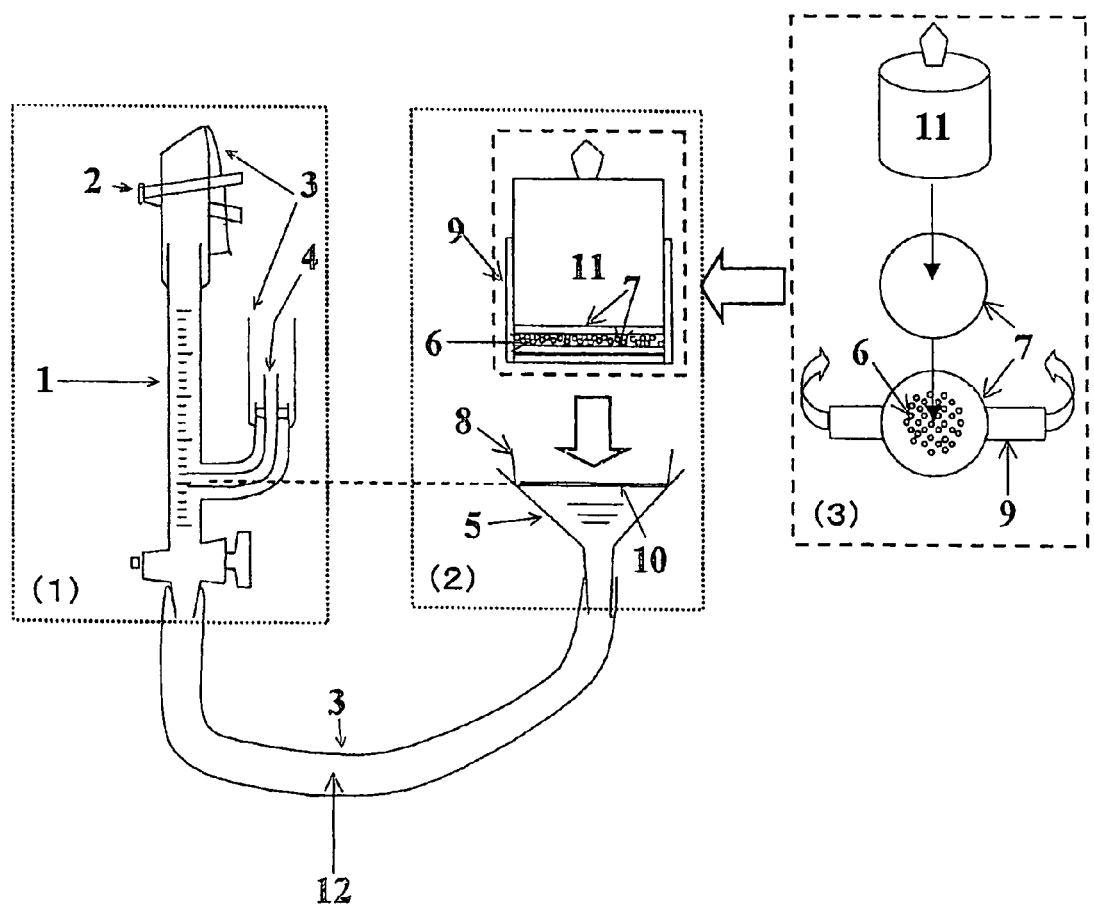
FIG. 1 shows an apparatus for measuring a water absorption amount under a pressurization condition, in which the follow reference numerals are used.
1 burette
2 pinch cock
3 silicone tube
4 polytetrafluoroethylene tube
5 funnel
6 sample (water absorbent polymer particles)
7 paper filter for holding sample
8 columnar cylinder (made of stainless, having many holes)
9 adhesive tape
10 paper filter for apparatus
11 weight (cylindrical, made of stainless)
12 deionized water

In the specification, the terms "acryl" and "methacryl" are together referred to as (meth)acryl. The terms "acrylate" and "methacrylate" are together referred to as (meth)acrylate.

The water absorbent polymer particle used in the present invention functions as a pore-forming agent, and has a water absorption amount in a range of 5 to 30 ml/g at a pressure of 980 Pa. This means that 1 g of the water absorbent polymer in a dry state is capable of absorbing 5 to 30 ml of deionized water.

If the water absorption amount at a pressure of 980 Pa is less than 5 ml/g, it is necessary to add a great amount of pore-forming agent in order to obtain a sufficient porosity, and thus it is sometimes problematic in that organic gas is excessively produced when baking, which sometimes goes beyond explosion limit, and a prolonged baking time is required. On the other hand, if it is greater than 30 ml/g, it may be difficult to control the hardness of a kneaded product and a baked product. For a reason thereof, it is believed that water contained in the water absorbent polymer is easily reversed when the mixture containing the water absorbent polymer particle, the ceramic raw material and water is kneaded due to a shear force applied to the mixture, and that consequently a water-absorbing amount and a particle diameter of the polymer are easily changed. It is also not preferable because a large amount of water is required for preparing the kneaded product (or argil) with appropriate hardness for molding and an energy amount required for drying a water content is remarkably increased.

When the water absorption amount at a pressure 980 Pa is represented as X ml/g and the water absorption amount at a pressure of 9800 Pa is represented as Y ml/g, it is preferable that the water absorbent polymer particles have a ratio of X/Y in the range of 1.0 to 1.6. When the above ratio is greater than 1.6, it may be difficult to control the hardness of the kneaded product and the baked product. For a reason thereof, it is believed that the water contained in the water absorbent polymer is easily reversed due to the shear force applied to the mixture when the mixture containing the water absorbent polymer, the ceramic raw material and the water is kneaded, and that consequently a water-absorbing rate and a particle diameter of the polymer are easily changed. Normally, the ratio is never less than 1.

The water absorbent polymer particle having 30 ml/g or less of the water absorption amount at a pressure of 980 Pa also has a relatively high crosslinking density and a relatively high strength. This is generally equivalent to that the larger "(osmotic pressure of ions)+(affinity of macromolecular electrolyte)" is, that the larger the water absorption amount is, "the greater the crosslinking density of polymer particles is, the less the water absorption amount is" and that "the strength of polymer particles is increased in proportion to the crosslinking density of polymer particles".

The water absorbent polymer particle is preferably spherical in shape in the state where the particle has absorbed water and has been swollen. An average particle diameter in the saturated water-absorbing state falls preferably into the range of 1/30 to 1/1, more preferably 1/15 to 1/2, and still more preferably 1/15 to 1/3 based on a thickness of a ceramic molded product. When the particle diameter is excessively low, a porosity of the resulting ceramic baked product becomes low. For example, when the ceramic baked product is used as a filter, a pressured loss of gas or liquid passed through becomes large in some cases. When the particle diameter is excessively large, the strength of the resulting ceramic baked product becomes insufficient in some cases. The thickness of the ceramic molded product means a thickness of an individual wall when the ceramic molded product has multiple wall structures composed of the ceramic, and does not mean a thickness of a cluster as the entire ceramic molded product.

Examples of the water absorbent polymer particles include (1) one where a polymer obtained by polymerizing a vinyl monomer in an aqueous solution is dried followed by being pulverized into appropriate sizes, (2) a spherical polymer obtained by inverse suspension polymerization of a vinyl monomer, (3) a water absorbent polymer obtained by giving a modification treatment such as saponification to spherical hydrophobic polymer particles obtained by suspension polymerization of a vinyl monomer, and (4) one which makes a modified product of a graft polymer containing a macromolecular unit composed of starch and a macromolecular unit except for starch as an active ingredient.

Examples of the vinyl monomers which can be used in the above (1) and (2) include water soluble monomers having hydrophilic group, such as sulfone group, carboxyl group, amide group, amino group and hydroxyl group, i.e., 2-acrylamide-2-methylpropanesulfonic acid, 2-(meth)acryloyl ethanesulfonic acid, styrenesulfonic acid, (meth)acrylic acid, maleic acid, itaconic acid, crotonic acid, fumaric acid and/or partially alkali neutralized products thereof, (meth)acrylamide, N,N-dimethylacrylamide, N-isopropylacrylamide, N-methylol(meth)acrylamide, N-alkoxymethyl(meth)acrylamide, diethylaminoethyl (meth)acrylate, dimethylaminoethyl (meth)acrylate, 2-hydroxyethyl (meth)acrylate, N-vinylpyrrolidone, acryloylmorpholine and the like. Such monomers may be used in mixture with two or more. In terms of easy control of polymerization and water-absorbing performance, 2-acrylamide-2-methylpropanesulfonic acid, 2-(meth)acryloylethanesulfonic acid, (meth)acrylic acid, (meth)acrylamide, N,N-dimethylacrylamide, and N-methylol(meth)acrylamide are preferable, and in particular, 2-acrylamide-2-methylpropanesulfonic acid and acrylamide are preferable.

Examples of the polymer of (3) include a saponified product of a copolymer of vinyl acetate and methyl acrylate. The polymer of (4) includes, for example, modified polymers, such as a starch-(meth)acrylic acid graft resin, a saponified product of a starch-acrylonitrile copolymer and a saponified product of a starch-acrylamide copolymer. Additionally, a crosslinked body of a modified copolymer made of isobutylene and maleic acid anhydride may be included. Two or more of the water absorbent polymers previously shown may be combined.

Among them, the spherical water absorbent polymer particle synthesized by the inverse suspension polymerization is the most preferable because it has a good miscibility with the ceramic ingredient and a particle diameter and a water absorption rate are easily controlled by selecting a polymerization condition. A shape of a water absorbent polymer particle affects a shape of a pore of the porous ceramic obtained by baking. Generally, when the shape of the pore of the baked porous ceramic body is spiky, it has been known that stress is concentrated to a tip of a spiky shape to be easily broken and a strength thereof becomes insufficient. On the contrary, a spherical water absorbent polymer particle is desirable because the pore becomes spherical and thus a ceramic strength becomes high. When a pulverized article of the water absorbent polymer is used, it is preferable to uniform the particle diameter by classifying after the pulverization.

The water absorbent polymer may be a crosslinked one. The crosslinked water absorbent polymer has a relatively high strength and thus the shape is unlikely to break up in a step of kneading with ceramic raw materials. Therefore, it is easy to obtain the porous ceramic which is exactly the same as a design having the pores with intended shape and size.

One example of means for introducing a crosslinking structure into the water absorbent polymer includes simultaneous use of a crosslinking agent which is a multifunctional vinyl monomer when producing the water absorbent polymer. Examples of the multifunctional vinyl monomer used as the crosslinking agent include di- or tri-(meth)acrylate of polyols, such as polyethyleneglycol di(meth)acrylate, polypropyleneglycol di(meth)acrylate, glycerin tri(meth)acrylate, and trimethylolpropane tri(meth)acrylate; and bisamides, such as methylenebis(meth)acrylamide. Among them, methylenebisacrylamide and polyethyleneglycol diacrylate are particularly preferable.

Preferable amount of the multifunctional vinyl monomer to be used is 0.1 to 10 mol, more preferably 0.5 to 8 mol, and still more preferably 1.0 to 5 mol based on 100 mol of a monofunctional vinyl monomer to be used. That is, molar ratio of the multifunctional vinyl monomer to the monofunctional vinyl monomer is in a range of 0.1:100 to 10:100. If the amount of the multifunctional vinyl monomer is less than 0.1 mol based on 100 mol of a monofunctional vinyl monomer, an effect to enhance the strength of the kneaded product with the ceramic raw material can not be sufficiently exerted in some cases. If the amount of the multifunctional vinyl monomer is greater than 10 mol based on 100 mol of a monofunctional vinyl monomer, it is difficult to adjust to a preferable water-absorbing performance in some cases.

As another example of means for introducing the crosslinking structure into the water absorbent polymer, there is a method of using a crosslinking agent having a reactivity with a carboxyl group and a neutralized carboxyl group contained in a monomer constituting the water absorbent polymer. Examples of said monomer constituting the water absorbent polymer include an unsaturated carboxylic acid monomer and a partially neutralized salt of the unsaturated carboxylic acid monomer. Examples of such a crosslinking agent include polyglycidyl compounds, such as (poly)ethyleneglycol diglycidyl ether, (poly)propyleneglycol diglycidyl ether, (poly)glycerol diglycidyl ether, (poly)glycerol triglycidyl ether, sorbitol diglycidyl ether, sorbitol triglycidyl ether, pentaerythritol diglycidyl ether, pentaerythritol triglycidyl ether and pentaerythritol tetraglycidyl ether; haloepoxy compounds, such as epichlorohydrin, epibromohydrin and α-methyl-epichlorohydrin; and isocyanate compounds, such as 2,4-tolylene diisocyanate and hexamethylene diisocyanate. Among them, ethyleneglycol diglycidyl ether is particularly preferable.

When a cordierite raw material is used as a ceramic raw material, as the water absorbent polymer, those which contain no alkali metal and no alkali earth metal are desirable. Because, if the polymer which contains the above metal abundantly, a cordierite reaction is inhibited to cause physical property reduction, e.g., increase of thermal expansion coefficient. Therefore, for the water absorbent polymer containing sulfone group and carboxyl group therein, it is desirable that these functional groups do not exist as a sodium salt and a potassium salt and exist in a unneutralized state or as an ammonium salt. Additionally, the water absorbent polymer containing a nonionic hydrophilic functional group is included as a desirable one. Examples of the nonionic hydrophilic functional group include hydroxyl group, oxyalkylene group, such as oxyethylene group and oxypropylene group, amide group, and the like.

The ceramic raw materials used in the present invention include pottery and porcelain materials, e.g., clay, clay mineral, chamotte, silica, silica sand, diatomaceous earth, pottery stone, feldspar, blast furnace slag, whitebait, whitebait balloon, fly ash, and in addition, special ceramic raw materials, e.g., cordierite, talc, alumina, kaolin, aluminum hydroxide, magnesia, ferrite, zeolite, mullite, apatite, slag, silicon carbide, zirconia, aluminum nitride and aluminum titanate, and raw materials for electrodes of batteries, e.g., nickel powder, cobalt powder, lantern manganite, lantern strontium manganite, and the like.

A method for producing the porous ceramic includes kneading and molding a mixture containing the above ceramic raw material, the water absorbent polymer particles and water. If necessary, the mixture may further contains a binder, such as methyl cellulose, and a lubricant, such as olefin wax. The kneading may be performed according to any known methods, and can be performed with using, for example, a kneader, a pony mixer, a screw extruder, a vacuum kneader, or the like. As the ceramic raw material, powder is normally used.

Also, steps of drying and baking the resulting molded product are included. The drying and baking may be performed according to any known methods. A high-frequency dielectric exothermic heating apparatus, a hot air dryer, a heated bed dryer, a mangle dryer, a tunnel dryer and the like can be used. Normally, it is preferable to dry at a temperature of 150° C. or less until the product does not substantially contain moisture. The baking is performed by heating to a temperature greater than 150° C., and preferably to 800° C. or greater. A baking temperature and a baking time are set so that organic materials, such as the water absorbent polymer particles and the binder, are sufficiently burned and the ceramic raw material is sufficiently baked.

For a ratio of amounts of the ceramic raw material to the water absorbent polymer particles to be used, the amount of the water absorbent polymer particles is preferably 0.1 to 20 parts by mass, and more preferably 0.5 to 10 parts by mass based on 100 parts by mass of the ceramic raw material in a dry state (containing no water). When the amount of the water absorbent polymer to be used is less than 0.1 parts by mass, a sufficient porosity is not obtained in some cases. When it is greater than 20 parts by mass, it is sometimes problematic in that organic gas is excessively produced at baking, which sometimes goes beyond an explosion limit, and a baking time is prolonged, a volume change during the baking is large, and thus the resulting ceramic molded product easily becomes one having distortions and cracks.

The mixture containing the water absorbent polymer particles, the ceramic raw material and water is obtained by mixing these raw materials by arbitrary methods. The amount of water to be used is regulated depending on types of the water absorbent polymer particles and the ceramic raw material and formulation thereof so that preferable hardness and moldability of the kneaded product are obtained. The amount of 100 parts by mass or less of water to be used based on 100 parts by mass of the ceramic raw material is preferable because a time required for drying the kneaded product and energy cost are not excessive.

A method for adding the water absorbent polymer particles in raw material mixing may be either a method for adding a hydrous one (water absorbing state) or a method for adding a dried one. An appearance of the water absorbent polymer particles in a hydrous state may be a powder or a paste.

When the water absorbent polymer particles in the hydrous state is used, a moisture content ratio thereof is not particularly limited, but it is preferable to make the moisture ratio capable of handling the water absorbent polymer as the powder, i.e., in the range where the water absorbent polymer has fluidity. Because, it is difficult to handle the polymer particles in a gel state due to the high hydrous ratio, mixing and dispersing with the ceramic raw material become insufficient, and the strength and the porosity of the ceramic molded product after baking become insufficient in some cases.

The water absorbent polymer particles in a dry powder or a powder where the hydrous ratio is controlled are easily mixed with the ceramic raw material, and the resulting mixture of the water absorbent polymer particles and the ceramic raw material has highly uniform dispersibility. That is, a method in which water is added to and mixed with the powder mixture of the water absorbent polymer particles and the ceramic raw material where the powder water absorbent polymer particles and the powder ceramic raw material have been mixed in advance is a preferable method by which the resulting raw material mixture easily becomes uniform and in a ceramic molded product obtained by drying and baking a molded raw material mixture, the strength is high and a pore distribution is uniform. On the other hand, in a method in which the powder water absorbent polymer particles and the powder ceramic raw material have not been mixed in advance and the water absorbent polymer particles, the ceramic raw material and water are substantially simultaneously mixed, the resulting raw material mixture sometimes becomes uneven, and in a ceramic molded product obtained by drying and baking a molded raw material mixture, the strength is insufficient and a pore distribution is uneven in some cases.

In the kneading and molding steps, for obtaining good moldability, it is necessary to make the hardness of the kneaded product fall into an appropriate range. Generally, the hardness of the kneaded product is easily changed depending on the type of the ceramic raw material, the amount of the water absorbent polymer particles to be added, the water content and the kneading method, and the reproducible hardness is not often obtained even when the method is performed under the same condition. When the water absorbent polymer particles of the present invention are used under the condition once set, the intended hardness of the kneaded product is easily reproduced, therefore, the steps are easily controlled and the molding can be stably performed. Any known methods can be employed for other conditions.

EXAMPLES

Preparation Example 1

Production of Water Absorbent Polymer Particles A to E by Inverse Suspension Polymerization In a 3 liter separable flask, 1603 g of n-hexane and 10 g of sorbitan monolaurate (HLB 4.3) were placed and dissolved. Meanwhile, 96 g of acrylic acid, 224 g of 2-acrylamide-2-methylpropanesulfonic acid, and 14.9 g of methylene bisacrylamide (crosslinking agent; amount of the crosslinking agent is 4 mol based on 100 mol of monomers except for the crosslinking agent) were dissolved in 286.4 g of deionized water, and 124.67 g of an aqueous solution of 25% ammonia was added with ice-cooling to prepare a partially neutralized (75 mol % neutralized) monomer aqueous solution.

The monomer aqueous solution was added with stirring the content in the separable flask at 400 rpm (rotation/min), and nitrogen substitution was performed at a flow rate of 200 ml/min for 2 hours until a dissolved oxygen concentration became sufficiently low. An external temperature was controlled at 30° C., and when the temperature of the content in the flask became stable, 0.58 g of an aqueous solution of 6.9% t-butylhydroperoxide was added. Then, 0.90 g of an aqueous solution of 5% sodium bisulfite was added in five portions, and in which one portion was added to initiate polymerization. A temperature elevation in a reaction solution due to polymerization heat was observed. When the temperature of the reaction solution was lowered to the temperature which was nearly equal to the external temperature controlled at 30° C., one portion of the remaining 4 portions of the sodium bisulfite aqueous solution was added. A procedure where when the temperature was once elevated and then lowered to the temperature nearly equal to the external temperature, one portion of the sodium bisulfite aqueous solution was added was further repeated three times. After adding the fifth portion of the sodium bisulfite aqueous solution, when the once elevated temperature was lowered to the temperature nearly equal to the external temperature, the reaction solution was matured as it was for one hour. After the initiation of the polymerization, the external temperature was also controlled at 30° C., the nitrogen substitution was continued, and the stir at 400 rpm was continued until the completion of the reaction. After separating two phases by leaving to stand, a supernatant was discarded. Thereafter, a precipitate in a lower layer was dried at 120° C. for 6 hours, and pulverized by a pulverizer to yield spherical water absorbent polymer particles A.

The water absorbent polymer particles B and C were produced in the similar preparation condition for the water absorbent polymer particle A, except for changing the amount of methylenebisacrylamide to be added based on 100 mol of monomers except for the crosslinking agent to 3 mol and 2 mol, respectively.

The water absorbent polymer particle D was produced in the similar preparation condition for the water absorbent polymer particle A, except for changing the monomers except for the crosslinking agent to 224 g of 2-acrylamide-2-methylpropanesulfonic acid and 192 g of an aqueous solution of 50% acrylamide, and changing the amounts of 25% ammonia aqueous solution and the deionized water to 55.1 g and 261.8 g, respectively.

It was the similar preparation condition to that for the water absorbent polymer particle A that amount of methylenebisacrylamide, which serves as the crosslinking agent, was 4 mol based on 100 mol of the monomers except for the crosslinking agent.

The water absorbent polymer particle E was produced as was the case with the water absorbent polymer particle A, except for changing the monomers except for the crosslinking agent to 480 g of an aqueous solution of 50% acrylamide and 80.0 g of acrylic acid, and changing the amounts of 25% ammonia aqueous solution and the deionized water to 56.6 g and 114.7 g, respectively.

It was also the same condition as that for the water absorbent polymer particle A that amount of methylenebisacrylamide, a crosslinking agent, was 4 mol based on 100 mol of the monomers except for the crosslinking agent.

All of the water absorbent polymer particles B to E had a spherical shape.

Preparation Example 2

Production of Water Absorbent Polymer Particles F and G

An aqueous solution of 35% by mass of acrylic acid was prepared by mixing 100 g of acrylic acid and deionized water and then adding an aqueous solution of 25% ammonia to partially neutralize (75 mol % neutralization) with ice-cooling, and 20 g of Aronix M-245 (polyethyleneglycol diacrylate, repeat units of oxyethylene: about 9) supplied from Toagosei Co., Ltd. was added as the crosslinking agent. As photoinitiators, 0.01 g of 2,2-dimethoxy-2-phenylacetophenone and 0.1 g of ammonium persulfate were added to this monomer solution, which was then placed in a cylindrical glass vessel (reaction vessel) with an inner diameter of 146 mm, and nitrogen bubbling was performed for 30 minutes with keeping the temperature of the aqueous solution at 20° C. Thereafter, ultraviolet light at a dose of 5.0 mW/cm$^2$ was irradiated for 3 minutes from the above portion of the reaction vessel using a 100 W black light (product name: H100BL, supplied from Toshiba Corporation) to make a sheet hydrous crosslinked polymer gel (accumulated light intensity: 900 mJ/cm$^2$). This gel was dried and pulverized to afford crude particles of a water absorbent resin. Then, the crude particles were pulverized in a ball mill and those which passed through a sieve with 330 mesh (45 μm) were collected to yield the water absorbent polymer particles F.

The water absorbent polymer particle G was produced in the similar preparation condition for the water absorbent polymer particle F, except that 200 g of an aqueous solution of 50% acrylamide and deionized water were mixed to prepare the aqueous solution of 30% by mass of acrylamide, and 10 g of Aronix M-240 (polyethyleneglycol diacrylate, repeat units of oxyethylene: about 4) supplied from Toagosei Co., Ltd. was added as the crosslinking agent.

<Measurement of Water Absorption Amount Under Pressurization of Water Absorbent Polymer Particles>

A water absorption amount under pressurization of water absorbent polymer particles, i.e., the water absorption amount at a pressure of 980 Pa or 9800 Pa was measured using a measurement apparatus shown in FIG. 1. As is shown in FIG. 1, the measurement apparatus is composed of units (1) to (3). The unit (1) includes a burette 1 with a branch duct for air vent, a pinch cock 2, a silicone tube 3 and a polytetrafluoroethylene tube 4. In the unit (2), a columnar cylinder 8 having many holes at its bottom is placed on a funnel 5, and paper filter 10 for the apparatus is further placed thereon. As shown in the unit (3), a sample 6 of the water absorbent polymer particles is sandwiched between two sheets of paper filter 7 for holding the sample, which is then fixed to a cylindrical weight 11 by an adhesive tape 9. There are two types of cylindrical weights, and a load of 980 Pa or 9800 Pa is applied to the sample 6. The units (1) and (2) are communicated with a silicone tube 3. Heights of the funnel 5 and the columnar cylinder 8 are fixed with respect to the burette 1, and set so that the level of the lower end of polytetrafluoroethylene tube 4 placed in the burette branch duct and the level of the bottom of the columnar cylinder 8 are the same (dot line in FIG. 1).

The water absorption amount under pressurization was measured using the measurement apparatus of the above configuration. The measurement method will be illustrated below. The pinch cock 2 in the unit (1) was removed, deionized water was placed from the above portion of the burette 1 through the silicone tube 3, and the space from the burette 1 to the paper filter 10 in the apparatus was filled with the deionized water. Then, the pinch cock 2 was closed to retain the pressure inside the burette 1, and the air was removed from the polytetrafluoroethylene tube 4 connected to the burette branch duct through a rubber plug. Thus, the deionized water was continuously supplied from the burette 1 to the paper filter 10 for the apparatus. Then, excess deionized water which has bled from the paper filter 10 for the apparatus was eliminated, and subsequently a scale (a) of the burette 1 was read and recorded. Then, 0.05 g of the water absorbent polymer particle sample was weighed, evenly placed on a center portion of the paper filter 7 for holding the sample as shown in the unit (3), sandwiched the dry water absorbent polymer particle sample with another paper filter, and secured at the bottom of the cylindrical weight 11 by the adhesive tape 9. The weight 11 to which the sample was secured was placed on the paper filter 10 for the apparatus shown in the unit (2). Then, 30 minutes after placing the weight 11 on the paper filter 10 for the apparatus, a scale (b) of the burette 1 was read and recorded. The sum of the water absorption amounts (c) of the water absorbent polymer particles and two sheets of paper filter 7 is obtained from the expression of (a-b). By the same procedure, the absorption amount of two sheets of paper filter 7 which contained no water absorbent polymer particle was measured (d). The water absorption amount under pressurization was obtained from the following formula.

Water absorption amount under pressurization (ml/g)= (c-d)/(weight of water absorbent polymer particles (g))

As in the above, the water absorption amounts were measured for each sample with loads of 980 Pa and 9800 Pa.

<Measurement of Kneaded Product Hardness>

The hardness of the kneaded products (before molding/baking) obtained in Examples and Comparative Examples was measured by the method shown below. The kneaded product was tightly soaked in a 50 ml screw vial such that no space may be provided, and the surface was flattened. This kneaded product was retained at 23° C., and the hardness thereof was measured using a card meter (ME-303, Iio Denki) under the following conditions:

Load: 400 g;
Diameter of the pressure sensitive shaft: 3 mm φ; and
Fall velocity of the pressure sensitive shaft: 0.36 cm/sec.

The hardness of the kneaded product which had favorable moldability in the conditions used in Examples and Comparative Examples was in the range of $1.5 \times 10^4$ to $6.0 \times 10^4$ N/m².

<Evaluation of Moldability>

The appearance of the molded product (before baking) obtained by molding the kneaded product cylindrically by an extrusion molding method was visually evaluated. Those which had crack(s) or could not keep a cylindrical shape when left to stand were indicated by X (poor shape retention), and those which had no crack and were good in shape retention were indicated by o.

Example 1

The polymer particles A produced in Preparation example 1 were used as the water absorbent polymer particles. The water absorption amount of the polymer particles A at a pressure of 980 Pa was 9 ml/g, an X/Y ratio when the water absorption amount at a pressure of 980 Pa was X ml/g and the water absorption amount at a pressure of 9800 Pa was Y ml/g was 1.32, the water absorption amount at an ambient pressure (mass (including the mass of the polymer itself) represented by g unit when 1 g of the water absorbent polymer in a dry state absorbed and saturated deionized water at an ambient pressure) was 10 g/g, and an average particle diameter at a water-absorbing and saturated state was 40 μm. The water absorption amount of the polymer particles A at an ambient pressure means the water absorption amount measured with slightly pressing without using the "weight 11" in the above "Measurement of water absorption amount under pressurization of water absorbent polymer particles". The water absorption amount of the polymer particles B, C and D at an ambient pressure is the same as this.

As the ceramic raw material, kaolin, calcined kaolin, talc, alumina, aluminum hydroxide and silica, which are cordierite materials, were formulated at a mass ratio of 21:13:39:9:13:5 (total 100 parts by mass). Thereto, 4 parts by mass of methyl cellulose which was a binder, 1 part by mass of olefin wax which was a lubricant and 5 parts by mass of the water absorbent polymer particles A which was a pore making agent were added and mixed, subsequently 80 parts by mass of deionized water was added, and immediately kneaded by an σ-type kneader for 30 minutes. Subsequently, the kneaded product was molded cylindrically by an extrusion molding method, and water was eliminated by drying. The drying was performed at 120° C. until the weight almost became constant. Then, the temperature was raised to 1000° C., then the temperature was raised at a temperature rising rate of 50° C./hour from 1000° C. to 1400° C., and after the temperature reached 1420° C., it was retained to bake for 4 hours. A porosity of the baked body was measured by a mercury porosimeter.

Example 2

Example 2 was performed similarly to procedures of Example 1 except that the amount of deionized water was changed from 80 parts by mass to 90 parts by mass.

Example 3

Example 3 was performed similarly to procedures of Example 1 except that the amount of the water absorbent polymer particles A to be used was changed from 5 parts by mass to 3.1 parts by mass.

Example 4

Example 4 was performed similarly to procedures of Example 1 except for using the water absorbent polymer particles B produced in Preparation example 1 in place of the water absorbent polymer particles A. The water absorption amount at a pressure of 980 Pa of the polymer particles B was 13 ml/g, the X/Y ratio was 1.33, the water absorption amount at an ambient pressure was 15 g/g, and the average particle diameter at a water-absorbing and saturated state was 53 μm.

Example 5

Example 5 was performed similarly to procedures of Example 1 except for using the water absorbent polymer particles C produced in Preparation example 1 in place of the water absorbent polymer particles A. The water absorption amount at a pressure of 980 Pa of the polymer particles C was 20 ml/g, the X/Y ratio was 1.45, the water absorption amount at an ambient pressure was 23 g/g, and the average particle diameter at a water-absorbing and saturated state was 62 μm.

Example 6

Example 6 was performed similarly to procedures of Example 1 except for using the water absorbent polymer particles D produced in Preparation example 1 in place of the water absorbent polymer particles A. The water absorption amount at a pressure of 980 Pa of the polymer particles D was 11 ml/g, the X/Y ratio was 1.13, the water absorption amount at an ambient pressure was 13 g/g, and the average particle diameter at a water-absorbing and saturated state was 49 μm.

Example 7

Example 7 was performed similarly to procedures of Example 1 except for using the water absorbent polymer particles E produced in Preparation example 1 in place of the water absorbent polymer particles A. The water absorption amount at a pressure of 980 Pa of the polymer particles E was 10 ml/g, the X/Y ratio was 1.36, the water absorption amount at an ambient pressure was 12 g/g, and the average particle diameter at a water-absorbing and saturated state was 65 μm.

Example 8

Example 8 was performed similarly to procedures of Example 1 except for using the water absorbent polymer particles F produced in Preparation example 2 in place of the water absorbent polymer particles A. The water absorption amount at a pressure of 980 Pa of the polymer particles F was 27 ml/g, the X/Y ratio was 1.16, the water absorption amount at an ambient pressure was 29 g/g, and the average particle diameter at a water-absorbing and saturated state was 42 μm.

Example 9

Example 9 was performed similarly to procedures of Example 1 except for using the water absorbent polymer particles G produced in Preparation example 2 in place of the water absorbent polymer particles A. The water absorption amount at a pressure of 980 Pa of the polymer particles G was 19 ml/g, the X/Y ratio was 1.05, the water absorption amount at an ambient pressure was 22 g/g, and the average particle diameter at a water-absorbing and saturated state was 41 μm.

Example 10

Example 10 was performed similarly to procedures of Example 1 except for using the water absorbent polymer particles H (KI gel 201K, 330 mesh pass article supplied from Kuraray Isoprene Chemical Co., Ltd., pulverized article of salt of crosslinked body of modified isobutylene-maleic anhydride copolymer) in place of the water absorbent polymer particles A. The water absorption amount at a pressure of 980 Pa of the polymer particles H was 25 ml/g, the X/Y ratio was 1.32, the water absorption amount at an ambient pressure was 32 g/g, and the average particle diameter at a water-absorbing and saturated state was 60 μm.

Comparative Example 1

The same procedures as those in Example 1 were performed except for using 5 parts by mass of the water absorbent polymer particles I (KI gel 201K, granulated article supplied from Kuraray Isoprene Chemical Co., Ltd., salt of crosslinked body of modified isobutylene-maleic acid anhydrate copolymer) which were not pulverized in place of 5 parts by mass of the water absorbent polymer particles A. The water absorption amount at a pressure of 980 Pa of the polymer particles I was 35 ml/g, the X/Y ratio was 1.54, the water absorption amount at an ambient pressure was 200 g/g (value on the catalogue), and the average particle diameter at a water-absorbing and saturated state was 320 μm. The molding of the kneaded product was attempted, but the kneaded product was not successfully molded due to insufficient fluidity, and cracks were observed on the molded product.

Separately, when the amount of water to be added required for imparting an appropriate fluidity to this kneaded product was searched, it was found that 120 parts by mass of water was required. When the water at such a large amount was used, more time and energy were required and it was not practical.

Comparative Example 2

The same procedures as those in Example 1 were performed except for using 0.15 parts by mass of the water absorbent polymer particles I in place of 5 parts by mass of the water absorbent polymer particles A. The resulting kneaded product was poor in shape retention, and the molded product could not keep the shape.

Comparative Example 3

The same procedures as those in Example 1 were performed except for using 2 parts by mass of the water absorbent polymer particles I in place of 5 parts by mass of the water absorbent polymer particles A.

Comparative Example 4

The same procedures as those in Example 1 were performed except for using 5 parts by mass of the water absorbent polymer particles J (pulverized article of Sanfresh ST-500D supplied from Sanyo Chemical Industries Ltd., polyacrylic crosslinked resin) in place of 5 parts by mass of the water absorbent polymer particles A. The water absorption amount at a pressure of 980 Pa of the polymer particles J was 75 ml/g, the X/Y ratio was 1.09, the water absorption amount at an ambient pressure was 400 g/g (value on the catalog), and the average particle diameter at a water-absorbing and saturated state was 190 μm. The molding of the kneaded product was attempted, but the kneaded product was not successfully molded due to insufficient fluidity, and cracks were observed on the molded product.

Separately, when the amount of water to be added required for imparting an appropriate fluidity to this kneaded product was searched, it was found that 140 parts by mass of water was required. When the water at such a large amount was used, more time and energy were required and it was not practical.

Comparative Example 5

The same procedures as those in Example 1 were performed except for using 0.08 parts by mass of the water absorbent polymer particles J in place of 5 parts by mass of the water absorbent polymer particles A. The resulting kneaded product was poor in shape retention, and the molded product could not keep the shape.

Comparative Example 6

The same procedures as those in Example 1 were performed except for using 2 parts by mass of the water absorbent polymer particles J in place of 5 parts by mass of the water absorbent polymer particles A.

Comparative Example 7

The same procedures as those in Example 1 were performed except for using 5 parts by mass of the spherical water absorbent polymer particles K (Aqua Keep SA-60N supplied from Sumitomo Seika Chemicals Co., Ltd., polyacrylamide crosslinked resin) in place of 5 parts by mass of the water absorbent polymer particles A. The water absorption amount at a pressure of 980 Pa of the polymer particles K was 140 ml/g, the X/Y ratio was 1.93, the water absorption amount at an ambient pressure was 430 g/g, and the average particle diameter at a water-absorbing and saturated state was 710 µm. The molding of the kneaded product was attempted, but the kneaded product was not successfully molded due to insufficient fluidity, and cracks were observed on the molded product.

Separately, when the amount of water to be added required for imparting an appropriate fluidity to this kneaded product was searched, it was found that 150 parts by mass of water was required. When the water at such a large amount was used, more time and energy were required and it was not practical.

Comparative Example 8

The same procedures as those in Example 1 were performed except for using 0.06 parts by mass of the water absorbent polymer particles K in place of 5 parts by mass of the water absorbent polymer particles A. The resulting kneaded product was poor in shape retention, and the molded product could not keep the shape.

Comparative Example 9

The same procedures as those in Example 1 were performed except for using 2 parts by mass of the water absorbent polymer particles K in place of 5 parts by mass of the water absorbent polymer particles A.

Comparative Example 10

The same procedures as those in Example 1 were performed except for using 5 parts by mass of the spherical water absorbent polymer particles L (Aron zap TS-U-1 supplied from Toagosei Co., Ltd., crosslinked polymer having acrylic acid units and 2-acrylamide-2-methylpropanesulfonic acid units) in place of 5 parts by mass of the water absorbent polymer particles A. The water absorption amount at a pressure of 980 Pa of the polymer particles L was 98 ml/g, the X/Y ratio was 2.80, the water absorption amount at an ambient pressure was 150 g/g, and the average particle diameter at a water-absorbing and saturated state was 450 µm. The molding of the kneaded product was attempted, but the kneaded product was not successfully molded due to insufficient fluidity, and cracks were observed on the molded product.

Separately, when the amount of water to be added required for imparting an appropriate fluidity to this kneaded product was searched, it was found that 120 parts by mass of water was required. When the water at such a large amount was used, more time and energy were required and it was not practical.

Comparative Example 11

The same procedures as those in Example 1 was performed except for using 0.2 parts by mass of the water absorbent polymer particles L in place of 5 parts by mass of the water absorbent polymer particles A. The resulting kneaded product was poor in shape retention, and the molded product could not keep the shape.

Comparative Example 12

The same procedures as those in Example 1 were performed except for using 2 parts by mass of the water absorbent polymer particles L in place of 5 parts by mass of the water absorbent polymer particles A.

Comparative Example 13

The same procedures as those in Example 1 were performed except for using 5 parts by mass of the spherical water absorbent polymer particles M (Aron zap U supplied from Toagosei Co., Ltd., crosslinked polymer having an acrylic acid unit as a major structural unit) in place of 5 parts by mass of the water absorbent polymer particles A. The water absorption amount at a pressure of 980 Pa of the polymer particles M was 112 ml/g, the X/Y ratio was 1.67, the water absorption amount at an ambient pressure was 210 g/g, and the average particle diameter at a water-absorbing and saturated state was 590 µm. The molding of the kneaded product was attempted, but the kneaded product was not successfully molded due to insufficient fluidity, and cracks were observed on the molded product.

Separately, when the amount of water to be added required for imparting an appropriate fluidity to this kneaded product was searched, it was found that 120 parts by mass of water was required. When the water at such a large amount was used, more time and energy were required and it was not practical.

Comparative Example 14

The same procedures as those in Example 1 were performed except for using 0.14 parts by mass of the water absorbent polymer particles M in place of 5 parts by mass of the water absorbent polymer particles A. The resulting kneaded product was poor in shape retention, and the molded product could not keep the shape.

Comparative Example 15

The same procedures as those in Example 1 were performed except for using 2 parts by mass of the water absorbent polymer particles M in place of 5 parts by mass of the water absorbent polymer particles A.

Data for the hardness of the kneaded products, evaluation results of the moldability and the porosity of the baked bodies in Examples and Comparative Examples are shown in Table 1.

TABLE 1

| | | | Water absorbent polymer particle | | | | | | Kneaded product | | Baked product |
|---|---|---|---|---|---|---|---|---|---|---|---|
| | | type | water absorption amount at 980 Pa (ml/g) | X/Y ratio | water absorption amount at ambient pressure (g/g) | av. diameter of water saturated particle (μm) | Water amount (parts) | amount (parts) | hardness (N/m$^2$) | moldability | porosity (%) |
| Examples | 1 | A | 9 | 1.32 | 10 | 40 | 5.0 | 80 | 5.2 × 10$^4$ | ○ | 60 |
| | 2 | A | 9 | 1.32 | 10 | 40 | 5.0 | 80 | 4.5 × 10$^4$ | ○ | 62 |
| | 3 | A | 9 | 1.32 | 10 | 40 | 3.1 | 80 | 4.2 × 10$^4$ | ○ | 58 |
| | 4 | B | 13 | 1.33 | 15 | 53 | 5.0 | 80 | 5.3 × 10$^4$ | ○ | 62 |
| | 5 | C | 20 | 1.45 | 23 | 62 | 5.0 | 80 | 5.4 × 10$^4$ | ○ | 65 |
| | 6 | D | 11 | 1.13 | 13 | 49 | 5.0 | 80 | 5.4 × 10$^4$ | ○ | 61 |
| | 7 | E | 10 | 1.36 | 12 | 65 | 5.0 | 80 | 5.3 × 10$^4$ | ○ | 65 |
| | 8 | F | 27 | 1.16 | 29 | 42 | 5.0 | 80 | 5.6 × 10$^4$ | ○ | 58 |
| | 9 | G | 19 | 1.05 | 22 | 41 | 5.0 | 80 | 5.1 × 10$^4$ | ○ | 59 |
| | 10 | H | 25 | 1.32 | 32 | 60 | 5.0 | 80 | 5.2 × 10$^4$ | ○ | 59 |
| Comparative Examples | 1 | I | 35 | 1.54 | 200 | 320 | 5.0 | 80 | 9.3 × 10$^4$ | X (cracked) | — |
| | 2 | I | 35 | 1.54 | 200 | 320 | 0.15 | 80 | 0.4 × 10$^4$ | X (poor shape retention) | — |
| | 3 | I | 35 | 1.54 | 200 | 320 | 2.0 | 80 | 3.2 × 10$^4$ | ○ | 54 |
| | 4 | J | 75 | 1.09 | 400 | 190 | 5.0 | 80 | 9.2 × 10$^4$ | X (cracked) | — |
| | 5 | J | 75 | 1.09 | 400 | 190 | 0.08 | 80 | 0.2 × 10$^4$ | X (poor shape retention) | — |
| | 6 | J | 75 | 1.09 | 400 | 190 | 2.0 | 80 | 2.4 × 10$^4$ | ○ | 52 |
| | 7 | K | 140 | 1.93 | 480 | 710 | 5.0 | 80 | 8.7 × 10$^4$ | X (cracked) | — |
| | 8 | K | 140 | 1.93 | 480 | 710 | 0.06 | 80 | 0.1 × 10$^4$ | X (poor shape retention) | — |
| | 9 | K | 140 | 1.93 | 480 | 710 | 2.0 | 80 | 2.0 × 10$^4$ | ○ | 46 |
| | 10 | L | 98 | 2.80 | 150 | 450 | 5.0 | 80 | 8.9 × 10$^4$ | X (cracked) | — |
| | 11 | L | 98 | 2.80 | 150 | 450 | 0.20 | 80 | 0.3 × 10$^4$ | X (poor shape retention) | — |
| | 12 | L | 98 | 2.80 | 150 | 450 | 2.0 | 80 | 3.0 × 10$^4$ | ○ | 48 |
| | 13 | M | 112 | 1.67 | 210 | 590 | 5.0 | 80 | 8.6 × 10$^4$ | X (cracked) | — |
| | 14 | M | 112 | 1.67 | 210 | 590 | 0.14 | 80 | 0.2 × 10$^4$ | X (poor shape retention) | — |
| | 15 | M | 112 | 1.67 | 210 | 590 | 2.0 | 80 | 2.1 × 10$^4$ | ○ | 49 |

In Comparative Examples 1, 4, 7, 10 and 13, the same amount of the water absorbent polymer particles as that in Examples 1, 2, 4, 5, 6, 7, 8, 9 and 10 was used, and consequently the moldability of the kneaded product was poor and the molded product had a crack(s).

It can be speculated that considerable difference in the water absorption amounts under an ambient pressure of the known water absorbent polymer particles used in Comparative Examples and the water absorbent polymer particles used in Examples within the technical scope of the present invention may affect the above results. Thus, in Example 3, and Comparative Examples 2, 5, 8, 11 and 14, the experiments were performed using the amount where 30 parts by mass of deionized water calculated by subtracting 50 parts by mass required for kneading the ceramic raw material in the absence of the water absorbent polymer from 80 parts by mass which is the total deionized water amount to be used corresponded to the saturated water absorption amount. Consequently, in Example 3, the kneaded product had an appropriate hardness and the good moldability, but in Comparative Examples 2, 5, 8, 11 and 14, the hardness of the kneaded product was low and the moldability (shape retention) was poor.

Thus, in Comparative Examples 3, 6, 9, 12 and 15, the amount of the water absorbent polymer particles to be used was adjusted to 2 parts by mass. Consequently, the condition having the hardness of the kneaded product and moldability required was found, but the porosity of the resulting baked product was 46 to 54%, which was less than that in Examples.

Meanings of requirements which characterize the present invention described in claims will be complemented. The essence of the present invention is the use of the water absorbent polymer particles whose water absorption amount is relatively low (but is not zero) at around ambient pressure as the pore making agent (invention according to claim 1). When the water absorption amount of the water absorbent polymer particles is excessively low at around ambient pressure, the sufficient porosity is not obtained because the water amount which the polymer particles retain is low. When the water absorption amount of the water absorbent polymer particles is excessively large at around ambient pressure, it may be difficult to control hardness and pore distribution of the kneaded product and the baked product because the water reverses from the polymer particles to change the particle diameters when shear force is applied in the kneading step. However, the water absorption amount at ambient pressure is greatly affected by the measurement condition, and additionally when the particle diameters of the water absorbent polymer are too small, it is not easy to measure them and reproducibility of the obtained data for the water absorption amount is sometimes poor. Thus, in claim 1 of the present invention, the water absorption amount at a pressure of 980 Pa obtained by adding a slight load to the ambient pressure is defined as the good condition which typifies the ambient pressure (close to the ambient pressure) and in which the reproducibility is good.

In claim 2 of the present invention, it is defined that the water absorption amount when shear force is applied in the kneading step is not extremely low compared to the water absorption amount at around ambient pressure. When the water absorption amount at a pressure of 9800 Pa (corresponding to the shear force at kneading) is extremely low compared to the water absorption amount at a pressure of 980 Pa (approximating to the water absorption amount at around ambient pressure), the water reverses from the polymer particles to easily change the particle diameters which have absorbed the water when the shear force is applied in the kneading step, and thus, it may be difficult to control the kneaded product, the hardness thereof and the pore distribution.

In the aforementioned Japanese Laid-Open Patent Publication No. 10-167856, deformation of water absorbent gel was inhibited by making fine particles of the water absorbent resin with high gel strength absorb water and be saturated with water and by the use thereof as the pore making agent. However, the gel strength is for a water absorbent polymer gel containing saline whose water absorbability is considerably low compared to purified water, and when used by absorbing the deionized water, the reverse of water occurs, i.e., the water absorbent polymer having a relatively high water absorption amount is used. In paragraph 0012 of Japanese Laid-Open Patent Publication No. 10-167856, it is described that "an absorption performance for purified water is 50 g/g or greater, and preferably 100 to 1000 g/g". It is shown that it is the technique to use the water absorbent resin whose water absorption amount is larger than that of the water absorbent polymer particles suitably usable for the present invention. In Comparative Examples 4 to 6 of the present invention, the water absorbent polymer particles which appeared to be equivalent or similar to the water absorbent polymer used in Example in Japanese Laid-Open Patent Publication No. 10-167856 were used. In these Comparative Examples, the moldability was poor and the porosity was lower than that in Examples of the present invention.

In the method of suppressing the water absorption amount using saline, it is problematic in that the resulting baked porous ceramic body contains a salt in a large amount.

INDUSTRIAL APPLICABILITY

According to the present invention, it is possible to easily control the hardness and the pore distribution of the kneaded product with ceramic raw material and to provide a porous ceramic with high hardness and high porosity, by using the hard water absorbent resin where the water reverse due to a shear force caused by kneading unlikely occurs.

Intended uses of such a porous ceramic include filtration materials such as a ceramic filter for cleaning auto exhaust gas, a ceramic filter for cleaning exhaust gas exhausted from a thermal engine and a combustion equipment and a ceramic filter for filtering a liquid such as water, catalytic carriers such as catalysts for cleaning exhaust gas, heat exchange materials for cleaning automotive exhaust gas, thermal storage media, sintered substrates for batteries, heat insulating materials, and microbial carriers used for waste water disposal.

The invention claimed is:

1. A method for producing porous ceramic, the method comprising:
mixing dry water absorbent polymer particle powder and dry ceramic raw material powder to prepare a dry powder mixture, the dry ceramic raw material powder being without additional water prior to being mixed with water;
mixing the dry powder mixture with water to prepare wet powder mixture, wherein the wet powder mixture contains water absorbent polymer particles, the ceramic raw material, and the water;
molding the wet powder mixture containing the water absorbent polymer particle powder, the ceramic raw material, and the water, the water absorbent polymer particles having a water absorption amount in a range of 5 to 30 ml/g at a pressure of 980 Pa, wherein the water absorbent polymer particles, when swollen, have an average diameter 65 micrometers or less; and
heating and baking the resulting molded product.

2. The method for producing porous ceramic according to claim 1, wherein the water absorbent polymer particles have an X/Y ratio in a range of 1.0 to 1.6, wherein X represents the water absorption amount, ml/g, at a pressure of 980 Pa and Y represents the water absorption amount, ml/g, at a pressure of 9800 Pa.

3. The method for producing porous ceramic according to claim 1, wherein the water absorbent polymer particles are composed of a polymer obtained by radical polymerization of a monomer mixture containing a monofunctional vinyl monomer having one unsaturated bond and a multifunctional vinyl monomer having two or more unsaturated bonds, amount of the multifunctional vinyl monomer being in a range of 0.1 mol to 10 mol based on 100 mol of the monofunctional vinyl monomer.

4. The method for producing porous ceramic according to claim 1, wherein the water absorbent polymer particles are composed of a polymer obtained by polymerizing a vinyl monomer by inverse suspension polymerization.

5. The method for producing porous ceramic according to claim 1, wherein the water absorbent polymer particles are composed of a polymer having a 2-acrylamide-2-methylpropanesulfonic acid unit or an acrylamide unit as a constituting monomer unit.

6. The method for producing porous ceramic according to claim 1, wherein the water absorbent polymer comprises a crosslinking agent such that the water absorbent polymer particles have a crosslinked structure when the mixture is kneaded.

7. A method for producing porous ceramic, the method comprising:
mixing dry water absorbent polymer particle powder and dry ceramic raw material powder to prepare a dry powder mixture, the dry ceramic raw material powder being without additional water prior to being mixed with water;
mixing the dry powder mixture with water to prepare wet powder mixture, wherein the wet powder mixture contains water absorbent polymer particles, the ceramic raw material, and the water;
molding the wet powder mixture containing the water absorbent polymer particle powder, the ceramic raw material, and the water, the water absorbent polymer particles having a water absorption amount in a range of 10 to 32 g/g or 5 to 30 ml/g at a pressure of 980 Pa; and
heating and baking the resulting molded product.

8. The method of claim 7, wherein the water absorbent polymer particles have an X/Y ratio in a range of 1.0 to 1.6, wherein X represents the water absorption amount, ml/g, at a pressure of 980 Pa and Y represents the water absorption amount, ml/g, at a pressure of 9800 Pa.

9. The method of claim 7, wherein the water absorbent polymer particles, when swollen, have an average diameter 65 micrometers or less.

10. The method of claim 7, wherein the water absorbent polymer comprises a crosslinking agent such that the water absorbent polymer particles have a crosslinked structure when the wet powder mixture is kneaded.

11. A method for producing porous ceramic, the method comprising:
mixing a dry water absorbent polymer powder and ceramic raw material powder to prepare a dry powder mixture, the dry water absorbent polymer particle powder being without additional water prior to being mixed with water and having a water absorption amount in a range of 5 to 30 ml/g at a pressure of 980 Pa;

mixing the powder mixture with water to prepare wet powder mixture, wherein the wet powder mixture is said mixture containing a water absorbent polymer particle, a ceramic raw material, and water;

molding the mixture, wherein the water absorbent polymer particle; and heating and baking the resulting molded product.

12. The method of claim 11, wherein the ceramic raw material powder is a dry ceramic raw material powder being without additional water prior to being mixed with water.

13. The method of claim 11, wherein the water absorbent polymer particle has an X/Y ratio in a range of 1.0 to 1.6, wherein X represents the water absorption amount, ml/g, at a pressure of 980 Pa and Y represents the water absorption amount, ml/g, at a pressure of 9800 Pa.

14. The method of claim 11, wherein the water absorbent polymer particle, when swollen, has an average diameter 65 micrometers or less.

15. The method of claim 11, wherein the water absorbent polymer comprises a crosslinking agent such that the water absorbent polymer particle has a crosslinked structure when the mixture is kneaded.

* * * * *